(No Model.)
G. FREEMAN.
Vehicle Spring.
No. 243,440.      Patented June 28, 1881.
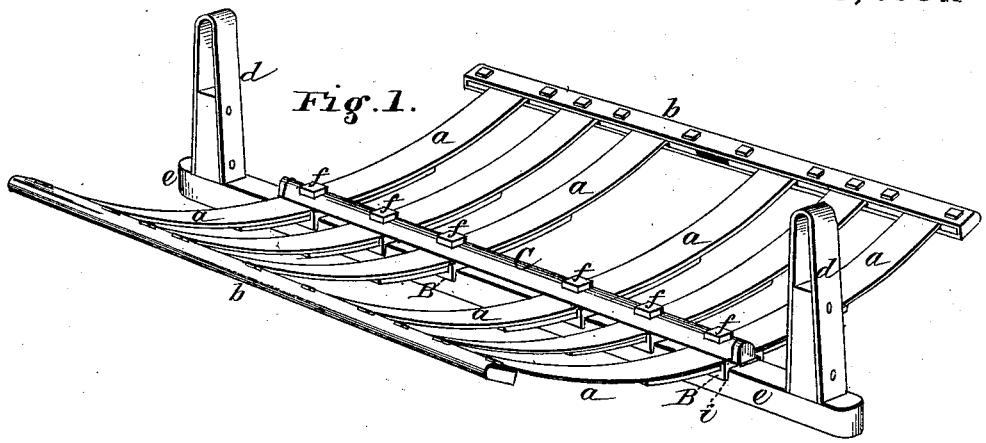
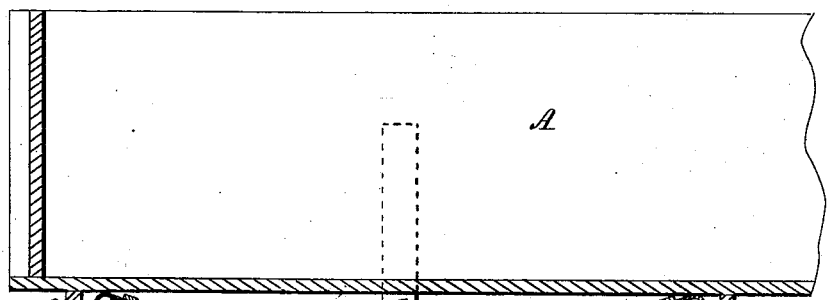
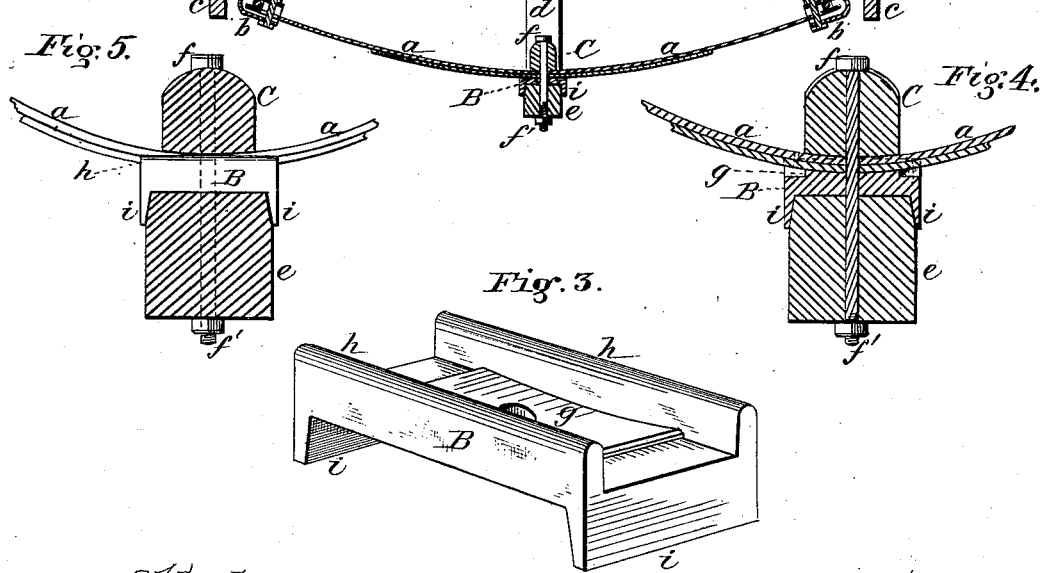
Attest,
W H H Knight
Floyd Norris
Inventor,
Green Freeman
by Johnson & Johnson
Attys

UNITED STATES PATENT OFFICE.

GREEN FREEMAN, OF PONTIAC, MICHIGAN, ASSIGNOR TO THE LEGAL TENDER WAGON SPRING COMPANY, OF SAME PLACE.

VEHICLE-SPRING.

SPECIFICATION forming part of Letters Patent No. 243,440, dated June 28, 1881.

Application filed January 24, 1881. (No model.)

*To all whom it may concern:*

Be it known that I, GREEN FREEMAN, a citizen of the United States, residing at Pontiac, in the county of Oakland and State of Michigan, have invented new and useful Improvements in Vehicle-Springs, of which the following is a specification.

My invention relates to improvements on the spring for which a patent was granted to Horace M. Keith, June 1, 1880, and in which a series of separate semi-elliptical springs are connected at their ends by cross-bars, upon which the body of the wagon rests, the connected springs forming a frame loosely seated upon the bolster by bars riveted to the springs and placed on each side of the bolster. The springs are liable to break at their riveted attachments to the bolster-bars; and the objects of my improvements are to prevent the breaking of the springs at the bolster-crossing, to render each spring and the frame of springs more durable, and to permanently connect and bind each spring of the frame to the bolster by means of a flanged seat and a bolt passing through the spring, the seat, the bolster, and a top clamping-bar, so that the bolster forms thereby a permanent part of the frame of springs. In the patent referred to the frame of springs is not attached to the bolster-bar. It is important to notice that each spring is bound upon a seat projection by the top clamping-bar, and that the bolster-bar forms a bottom clamping-bar, so that, the bolt passing through these two clamping-bars, the spring is clamped thereby in a manner to avoid breaking at the bolt-hole.

Referring to the accompanying drawings, Figure 1 represents a view, in perspective, of a frame of semi-elliptical springs embracing my improvement; Fig. 2, a vertical section taken through the frame of springs in line with one of the separate socketed spring-supports; Fig. 3, an enlarged view of one of the separate socketed supports for the spring; Fig. 4, an enlarged cross-section through the socket spring-support, the bolster, and the top clamping-bar; and Fig. 5, a similar section, the socket spring-support being shown in elevation.

The frame of springs consists of a series of semi-elliptical springs, $a$, placed parallel to each other, their upper ends being suitably connected by cross bearing-bars $b\ b$, and the number of such springs forming a frame of a width equal, or nearly so, to the width of the wagon-body. Two of such spring-frames are used for a wagon-body, one over and crossing each bolster, so that the body is supported, not only throughout its length, but throughout its width, upon four bearing-bars, which cross at or near each end of the body and near the middle of the length thereof. These bearing-bars are constructed to adapt them to slide upon the bottom of the wagon under the action of the load. Cleats $c\ c$ are secured across the under side of the wagon-box A in such relation to the cross bearing-bars $b$ as to form stops to limit their spreading under the action of the load. The body is held in place by the uprights $d\ d$ of the bolster $e$, and the frame of springs is secured to the bolster so as to bring the springs equally upon each side thereof, and to support and brace them separately in a manner which I will now described, and which constitutes my improvement. Each spring is secured to the bolster $e$ by a single bolt, $f$, centrally to a separate metallic support, B, formed with a slightly-raised seat, $g$, having a curve coincident with that of the spring, and for about one inch each way from the bolt, as shown better in Fig. 4. Raised sides $h\ h$ of the seat $g$ form a socket for the spring, and serve to brace it against lateral strain, to protect the securing-bolt $f$ against sudden thrusts and undue strain, and render the spring much less liable to break, being braced on both sides of the bolt and bound upon a seat between such side braces. The spring fits closely between the raised sides $h\ h$, and it is bolted at the middle of its support B, which is of a length greater than that of the seat $g$ proper and sufficiently longer than the width of the bolster $e$ to form a socket therefor by means of turned-down ends $i\ i$, adapted to fit over the sides of the bolster. These metallic supports for the springs are secured upon the bolster by the bolts which secure the springs, and the springs are clamped upon the seats of their supporting-sockets by a top bar, C, placed over and upon the springs in line with the bolster, the securing-bolt passing through the top bar, the spring, its socket-support, and the bolster, and bound by a nut, $f'$, beneath the bolster. These separate socket spring-supports occupy positions upon the bolster parallel to each other and at distances apart governed by the number of springs which may be used.

I do not claim a flanged seat adapted to receive the leaves of a semi-elliptical spring, and to which it is secured by a bolt, and which seat is adapted to be secured upon the axle by straps passing around the seat, spring, and axle; but a frame of connected springs in which the bolster-bar is made a permanent part of said frame, and in which each spring is bound to said bolster-bar by an intervening flanged seat and top clamping-bar by means of a bolt passing through all the parts, is an improvement adapted only for use with the bolster of a wagon and with the frame of springs having bearing-bars at their outer ends, and cannot, therefore, be used upon the axle.

I claim—

The combination of the frame of springs, constructed as described, with the separate seats for the springs, the top clamping-bar, C, the bolster $e$, and the securing-bolt $f$, whereby the bolster bar forms a permanent part of the frame of springs, and all the parts are firmly bound together by bolts passing through the top clamping-bar, the seats, the springs, and the bolster, substantially as described, and for the purpose specified.

In testimony whereof I have hereunto set my hand in the presence of two subscribing witnesses.

GREEN FREEMAN.

Witnesses:
A. J. CULVER,
K. D. HARGER.